ELECTRICAL COMMUNICATION APPARATUS

Filed June 20, 1962

2 Sheets-Sheet 1

INVENTORS
PAUL ABRAMSON
RICHARD W. BENNETT
GEORGE R. STILWELL, JR.

BY Robert E. Sandt

AGENT

United States Patent Office 3,215,984

Patented Nov. 2, 1965

3,215,984

ELECTRICAL COMMUNICATION APPARATUS

Paul Abramson and Richard W. Bennett, Yorktown Heights, and George R. Stilwell, Jr., West Nyack, N.Y., assignors to International Business Machines Corporation, New York, N.Y., a corporation of New York Filed June 20, 1962, Ser. No. 203,957
4 Claims. (Cl. 340—147)

This invention relates to electrical communication apparatus and more particularly to apparatus for causing an asynchronously operating transmitter and receiver to be operated in phased synchronism for a single cycle of operation to cause plural discrete manifestations at the receiver in response to selected signals generated by the transmitter.

It is known in the telegraph art to synchronize a transmitter and receiver for each successive cycle of operation by providing a mechanical one revolution clutch at the receiver, which clutch is engaged by the start pulse to cause the receiver to operate in phase with the transmitter for the cycle to follow. This start-stop form of data transmission is necessarily limited in its speed of operation by the capabilities of the mechanical clutch.

The foregoing limitations have hitherto been recognized by the prior art. Elimination of an intermittently driven element in the start-stop type of telegraphy has, for example, been stated as an object of the invention in U.S. Patent 2,403,009 to Thomas A. McCann. The foregoing patent employs an eraseable magnetic recording element upon which the start pulse is recorded to provide a sort of magnetic commutator for the regeneration of start-stop telegraph signals in a telegraph repeater apparatus. U.S. Patent 2,831,058 to J. L. Finch also employs a moving eraseable magnetic storage medium to convert serially occurring data-significant signals to parallel occurring signals on separate output lines.

The instant invention seeks to provide synchronous operation of a data transmitter and receiver operating in the start-stop mode of transmission without employment of intermittently driven elements, by transmitting a start signal followed by data signals spaced from the start signal at discrete data-significant times in the prescribed cycle of operation, which signals are serially recorded on a moving eraseable storage medium and gated out in parallel through spaced transducers by the sensing of the start signal by a synchronizing transducer. To further insure the integrity of the transmission, plural synchronizing signals spaced apart a non-integral multiple of the data bit spacing are preferably employed. Thus, the succession of pulses themselves provide the necessary control to effect the synchronous operation of the transmitter and receiver, as well as the apportionment of the data signals to their respective output channels, or work circuits, as the application may demand.

It is, therefore, an object of this invention to provide a data communication system of the start-stop mode of operation without use of intermittently driven elements and with a parallel output manifestation of the receiver of the transmitted data.

It is a further object to achieve the foregoing object through use of an eraseable storage medium upon which are seriately recorded the serially transmitted synchronizing and data signals for parallel readout from the medium when gate by the synchronizing signal.

Another and more specific object is to provide apparatus for generating and utilizing plural synchronizing signals whose time separation is a non-integral multiple of the time intervals separating the data signals to improve the reliability of the transmission.

The foregoing and other objects, features and advantages of the invention will be apparent from the following more particular description of a preferred embodiment of the invention, as illustrated in the accompanying drawings.

Figure 1:
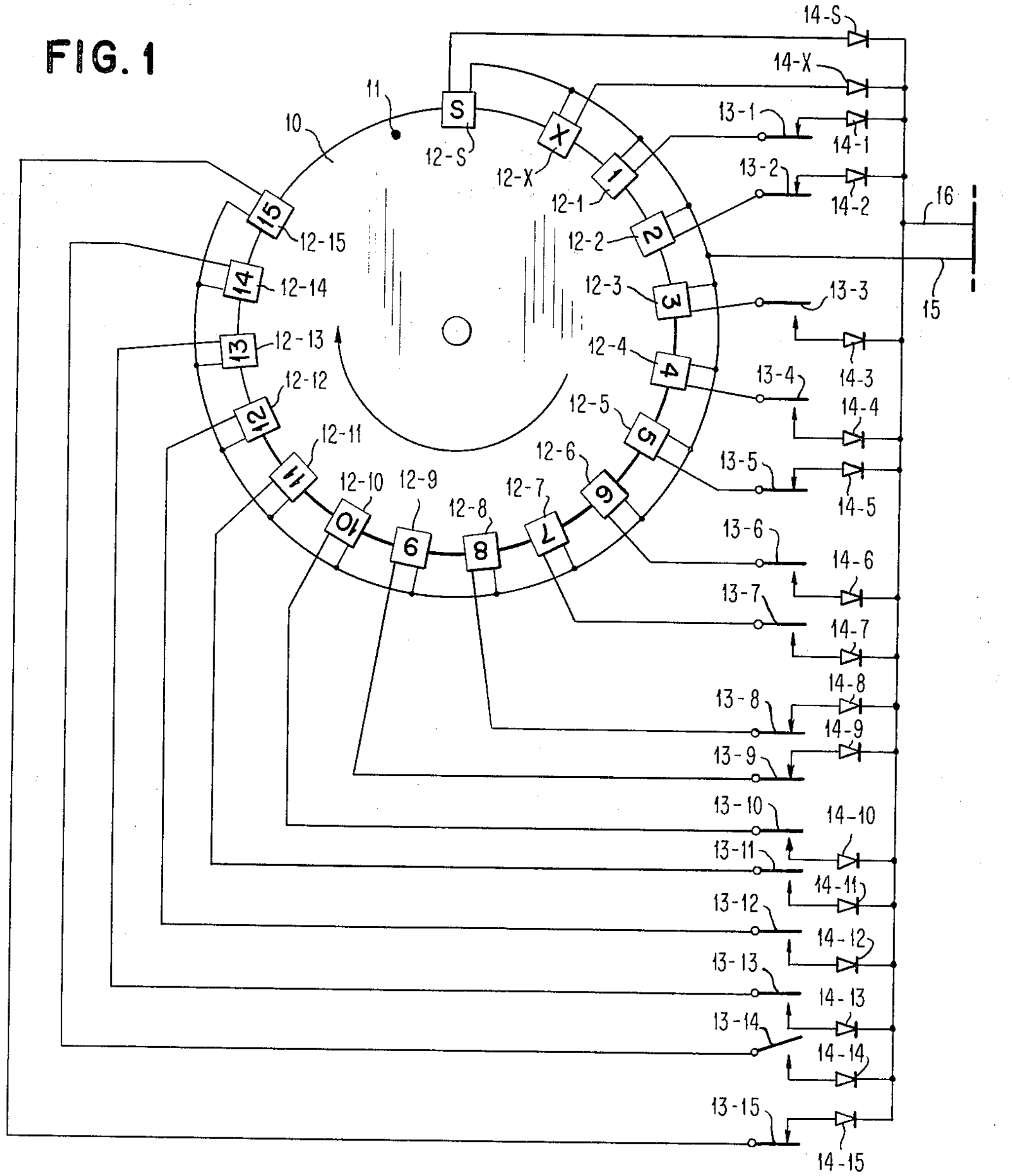
FIG. 1 is a semi-schematic showing of the transmitting apparatus.

The transmitter of FIG. 1 functions as a selective signal emitter, or commutator which invariably produces one or more start, or synchronizing, signals, followed by selected ones of a plurality of data-significant signals, each separated from the start signal, or signals, by a distinctive time interval. Although in the illustrated preferred embodiment, a form of magnetic commutator is employed, any of various forms of commutators can be used. The advantage of employing the magnetic commutator is that it serves as an electrical generator, thus obviating the need for a power supply.

Figure 4:
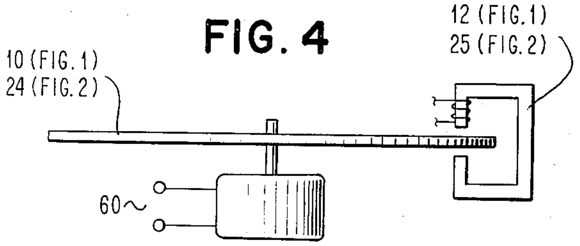
FIG. 4 is a typical section through the recording medium.

The transmitter of FIG. 1 consists of a magnetizable disc 10 upon which is pre-formed or pre-recorded a permanent magnetic spot 11. The disc 10 is rotated at substantially constant angular velocity by a synchronous motor powered from the commercial regulated 60 cycle power supply. The disc 10 is preferably constructed of non-magnetic material such as plastic or aluminum in which a small permanent magnet is inserted. This construction of the disc, coupled with a magnetic read head whose pole pieces straddle the disc 10 in close proximity (as is shown in FIG. 4) yields a dipole signal whose peak-to-peak signal strength is in the order of magnitude of 30 volts for a disc speed of 1200 r.p.m. Thus, with this signal strength, direct line transmission may be had without signal amplification. With the disc 10 rotating at substantially synchronous speed (1200 r.p.m.), the permanently magnetized spot will successively pass between the poles of the seriately disposed magnetic read heads 12–S, 12–X, 12–1 12–2 . . . 12–14, and 12–15, and induce a current flow in the windings thereof. By suitable angular disposition of the heads 12 about the periphery of the disc, the time of the occurrence of the various signals may be fixed. If, as in the structure illustrated, the read head 12–S is separated from the head 12–X by 27°, the head 12–X from 12–1 by 18°, and each succeeding head spaced 18° from the preceding head, then with the clockwise rotation shown the magnetic spot will induce a voltage in the head 12–S at 0 time, in the head 12–X at 3.75 milliseconds, in the head 12–1 at 6.25 milliseconds, in the head 12–2 at 8.75 milliseconds, etc., with each of the heads in the series 12–1 to 12–5 responding at intervals of 2.5 milliseconds. With the fifteen data pulse times, the complete series of synchronizing pulses and data pulses will be transmitted in 41.25 milliseconds within a cycle time of 50 milliseconds or a repetition rate of 20 cycles per second.

With the disposition of the read heads 12 relative to the disc 10 and the availability of data signals every 2.5 milliseconds, there remains only the selection of those of the available data pulses for transmission. This selection is most simply effected by the selective closure of one or more switches in the series 13–1 to 13–15 each of which switches has one contact thereof connected to one terminal of the signal winding on each of the respective read heads in the series 12–1 to 12–15 inclusive. The remaining contact of the switches 13–1 to 13–15 is connected to one terminal of each respective diode in the series 14–1 to 14–15. The remaining terminals of the diodes 14 are commoned and connected to one line 15 of the paired transmission lines 15 and 16. The remaining terminals of the signal windings on the data read heads in the series 12–1 to 12–15 are commoned and connected to the transmission line 16. The signal windings on the synchronizing read heads 12–S and 12–X are connected to the transmission lines 15 and 16 without any switches, but through diodes 14–S and 14–X. The diodes serve to prevent back circuits through non-pulsed heads, thus unnecessarily loading the circuit and weakening the signal delivered to the line.

Figure 3:
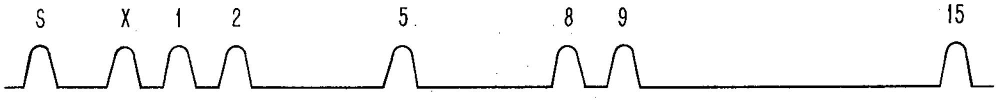
FIG. 3 is a timing diagram of a typical operation of the invention.

It is thus that upon each revolution of the disc 10, two synchronizing impulses produced by the heads 12–S and 12–X will be invariably transmitted on the lines 15 and 16 at 0 and 3.75 milliseconds of cycle time. Data pulses corresponding to the closure of the respective switches in the series 13–1 to 13–15 will be transmitted at their appropriate times. With the illustrated closure of switches (13–1, 13–2, 13–5, 13–8, 13–10, and 13–15), the relative time spacing of the transmitted signals will be that as shown in FIG. 3. The unipolar signals of FIG. 3 are derived from the bi-polar response of the read heads 12 of FIG. 1 by virtue of the rectifier action of the diodes 14 which only pass positive impulses to the transmission line 15.

The transmitter of FIG. 1 with its separate data-controlling switches 13 can obviously be employed to transmit fifteen different data signals in all their combinations. Thus, if binary digital data were to be transmitted, the capacity of the illustrated system would be a fifteen bit binary number. In such an application, the switches could be selectively closed manually from a keyboard, or automatically by a punched tape or card reader. In all such instances, additional heads would be provided in the angular void between the head 12–15 and 12–S, which heads would control interlocks at the transmitter to prevent repeated transmission of the same data, and to index the data input device to provide a new set of data for each successive cycle of operation.

The system is preferably employed as a condition reporting instrumentality, as for example, reporting the operating status of individual machines on a production floor. In this instance, the switches 13 would be closed whenever the associated production machines were operating. Because no local power supply is required for operation, other than the synchronous motor, the transmitter is inexpensively fabricated, and thus many such units can be dispersed about a factory floor. For this application the high bit densities sought in the magnetic storage of digital data is unnecessary, and in fact, were such densities required the equipment cost would mount. So too is a compromise made with the data repetition rate so as to permit the use of small synchronous motors. Then too, higher operating speeds and closer bit packing not only increases the cost of the equipment but also sacrifices reliability in that accurate synchronization between the transmitter and receiver become critical.

Figure 2:
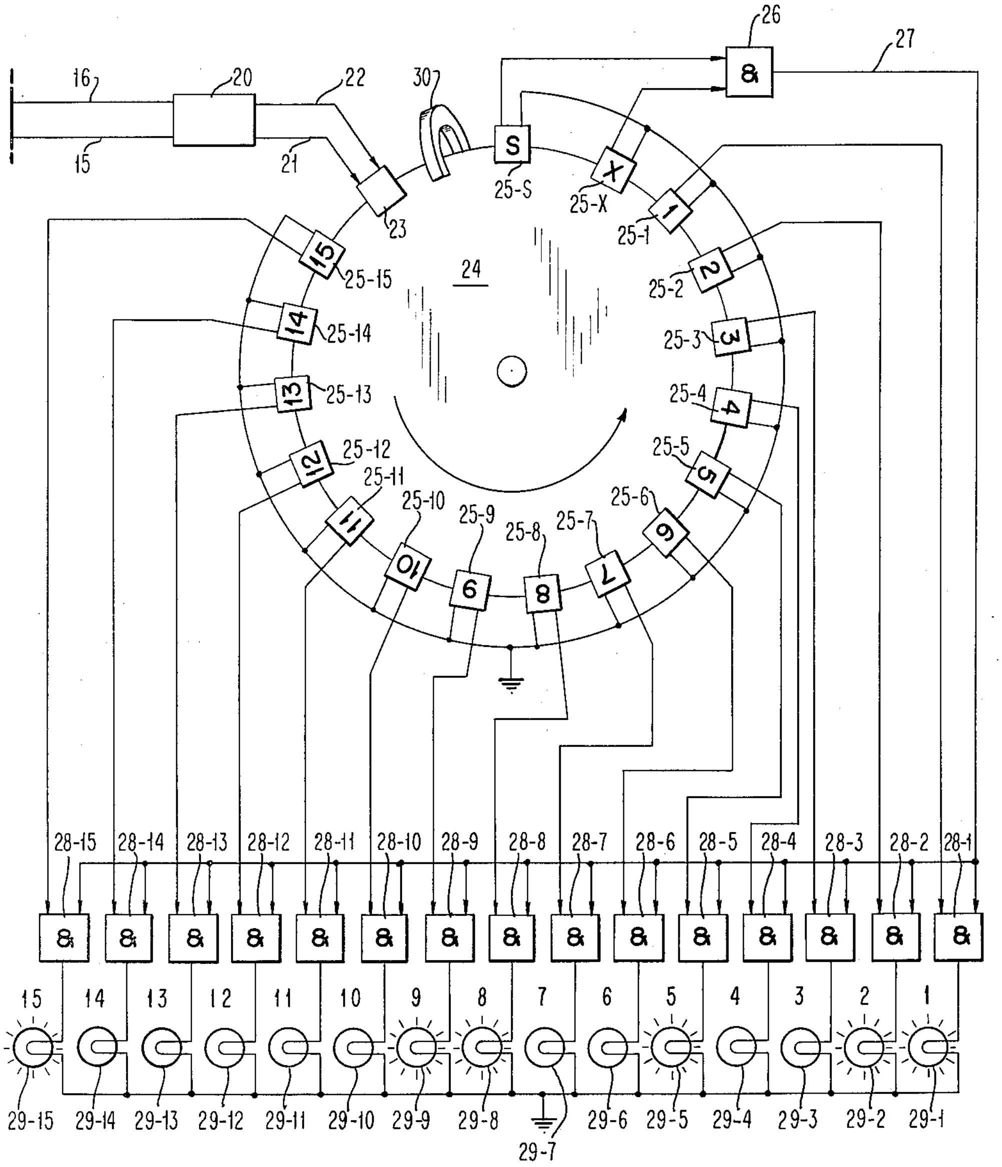
FIG. 2 is a semi-schematic showing of the receiving apparatus.

With the presence of the synchronizing and data signals on the paired transmission lines 15 and 16, the system now provides for the conversion of these serially-occurring time spaced pulses into a parallel output on a like number of output lines. The receiver in FIG. 2 is connected to the transmission lines 15 and 16 and receive the pulses whose timing is shown in FIG. 3. These pulses are received, shaped, and amplified by the blocking oscillator 20 and delivered via the wires 21 and 22 to a recording head 23 which straddles the magnetizable disc 24 to produce a vertically recorded spot for each of the transmitted signals. The disc is preferably made of a rubber-like material in which magnetic particles, such as barium ferrite are embedded, although other materials may be employed. Since the disc 24 is rotated counterclockwise at substantially the same speed as the disc 10 by a synchronous motor, these recorded signals will be presented successively to the read heads in the series 25–S and 25–15 in inverse order. However, although each recorded spot will induce a voltage response in each of the signal windings in the heads 25, these responses are ineffective until the end of the cycle, when the responses from the respective heads will be gated out simultaneously. Since the transmitted pulses occur in the order S, X, 1, 2, 5, 8, 9 and 15 (in the chosen example), and the heads 25 occupy the same relative angular positions as do the heads 12 in the transmitter, and the discs 24 and 10 are rotating at substantially synchronous speeds, the "S" and "X" recording synchronizing marks will induce simultaneous responses respectively in the heads 25–S and 25–X concurrent with the responses in the heads 25–1, 25–2, 25–5, 25–8, 25–9, and 25–15, induced by the respective recorded marks on the disc 24. The output from the heads 25–S and 25X are combined in AND gate 26 to produce the gating pulse to be simultaneuosly applied over line 27 to all of the AND gates in the series 28–1 to 28–15. Each of these AND gates has a second input from one of the terminals of the signal winding of the respective heads 25–1 to 25–15. Thus, in the chosen example, the responses of the heads 25–1, 25–2, 25–5, 25–8, 25–9, and 25–15 will half energize the correspondingly numbered AND gates in the series 28–1 to 28–15, which together with the remaining half-energization by the AND gate 26 will cause each of these now fully energized AND gates to produce an output. The occurrence of these outputs is manifested by lighting of the corresponding lamps in the series 29–1 to 29–15.

Following this simultaneous readout and manifestation of the transmitted signals, continued rotation of the disc 24 passes each successive recorded mark between the poles of an erase magnet 30 preparatory to a new cycle of transmission, recording, and readout.

Although the lamps 29 have been shown in the illustrative embodiment as a means for displaying the identity of the transmitted signals, it is obvious that in lieu thereof, any suitable work circuit could be connected. A computer, data logging device, or a digital storage medium could equally well be connected. However, for purposes of reporting the operating status of machines on a production floor, the lamp 29 is located in a supervisor's office would be periodically energized at a rate of 20 times per second for each operating machine. Through use of incandescent filament lamps (or neon lamps) and by virtue of the persistence of human vision, this indication will provide a substantially constant level of illumination at least sufficient to distinguish between the dark and the illumined condition of the lamp.

While the use of two synchronizing signals "S" and "X" separated from one another by one and one half data bit times has been illustrated, it is equally possible to employ only a single synchronizing signal, as for example, the signal "S." In this instance, the AND gate 26 would be eliminated. It is, however, still necessary that this single synchronizing signal bear some non-integral relationship to the spacing of the data signals, lest after the desired readout the recorded data bits, when they pass the head 25–S, would gate out unwanted signals from those heads having recorded data signals in coaction therewith, but out of phase. With the two synchronizing signal system the heads 25–S and 25–X can never be simultaneously pulsed by any data signals, so that the AND gate 26 can only be energized once in the cycle and thus block any outputs at all other times. This two signal system provides a greater margin of safety, and permits of greater tolerance in disc speed, signal width on the transmission line, and signal width recording on the disc.

Because no attempt has been made to achieve maximum speed in data transmission the necessary equipment has been reduced to a minimum. So too has reliability of operation been achieved by elimination of any critical parameters in the operation. Thus, the commercial 60 cycle power supply, although it may vary slightly in frequency provides sufficiently constant disc speeds to permit of synchronism between the remote discs to the degree necessary for successful operation of the system. So also may low fidelity transmission lines be employed, as the waveform and timing of the transmitted signals is not critical.

While the invention has been particularly shown and described with reference to a preferred embodiment thereof, it will be understood by those skilled in the art that various changes in form and details may be made therein without departing from the spirit and scope of the invention.

What is claimed is:

1. In a data transmission system including a remotely disposed data transmitter and data receiver operatively connected by a communication link, the combination of (a) an emitter in said transmitter for cyclically producing a succession of electrical impulses including at least one synchronizing impulse and a plurality of data-significant impulses, the said data-significant impulses occurring at equally spaced time intervals, and said synchronizing impulse preceding the first of said data-significant impulses by a non-integral multiple of the time interval separating said data-significant impulses;

(b) means at said transmitter for connecting the synchronizing impulse and selected ones of said data-significant impulses to said communication link for transmission thereover to said data receiver;

(c) an eraseable storage medium in said receiver moving through a cyclical path with a substantially constant velocity;

(d) a recording means coacting with said storage medium and operable responsive to the impulses appearing on said communication link for recording on said recording medium discrete sensible spaced manifestations for each of the transmitted impulses, as successive areas of said storage medium pass said recording means;

(e) a plurality of instrumentalities so spaced along the path of movement of said recording medium and in coaction therewith such that each respective instrumentality is simultaneously aligned with a different respective one of said recorded manifestations at a fixed time subsequent to the complete recording of all the impulses transmitted over said communication link, and each operable responsive to said manifestations to produce a respective output signal;

(f) means responsive to the output signal produced by the instrumentality in coaction with the recorded manifestation of said synchronizing impulse for gating out the output signals from the remaining instrumentalities;

(g) and means coacting with said storage medium and spaced along its path of movement after the instrumentality coacting with the recorded manifestation of said synchronizing impulse for destroying each recorded manifestation.

2. In the combination of claim 1, the eraseable storage medium comprising a magnetizable disc rotated at substantially constant angular velocity by a synchronous motor energized from a commercial source of frequency regulated alternating current.

3. In the combination as defined by claim 2 the recording means comprising, (a) a magnetic recording head having a magnetic core and a pair of pole pieces defining a non-magnetic gap through which said disc moves and (b) a signal winding on said core connected to said communication link and operable responsive to the electrical impulses thereon to produce a magnetic field in said gap to magnetize successive incremental areas of said disc material for each transmitted impulse.

4. In a data transmission system including a remotely disposed data transmitter and data receiver connected by a communication line, the combination of, (a) a magnetic disc at said transmitter rotated at substantially constant angular velocity by a synchronous motor powered from a commercial source of frequency regulated alternating current, and having a single discrete area thereof permanently magnetized;

(b) a succession of magnetic reading heads equal in number to two more than the number of different information signals to be transmitted, disposed circumferentially in coaction with said disc and each operative responsive to the passage of said permanently magnetized area to emit an electrical response, the first two of said heads being spaced apart a given distance, and each of the remaining heads being spaced from the head preceding it by a distance equal to a predetermined fraction of said given distance;

(c) means permanently connecting said first two magnetic heads to said communication line to provide two synchronizing impulses for each rotation of said disc;

(d) a switch for selectively connecting each of the remaining magnetic heads to said communication line to provide a selection of data pulses to be transmitted;

(e) a magnetic disc at said receiver rotated at substantially constant angular velocity by a synchronous motor powered from a commercial source of frequency regulated alternating current;

(f) a magnetic recording head in coaction with said disc in said receiver and connected to said communication line such that it is operative responsive to each of the impulses transmitted thereover to magnetize a discrete spaced spot on said disc for each received impulse;

(g) a plurality of magnetic reading heads, equal in number to the number of heads in said transmitter, in coaction with said receiver disc, and disposed along the path of movement of said disc such that the first of said heads is separated from said recording head, and each successive head, except the last, is separated from the preceding head by a fixed angular distance, and the last of said heads is separated from the preceding head by an angular distance which is a multiple of the said fixed angular distance, which multiple is the inverse of said predetermined fraction; the angular separation of the heads being so chosen with respect to the receiver disc speed that the succession of recorded spots will be simultaneously presented to all of the respective reading heads once during each revolution of said disc;

(h) a signal winding on each of said reading heads in said receiver and operative responsive to the passage of any recorded magnetic area to produce an output response;

(i) a first logical AND gate having a single output terminal and two input terminals connected respectively to the signal windings on the last two reading heads in said receiver, (j) a plurality of logical AND gates, one for each of the remaining reading heads in said receiver, each having a single output terminal and two input terminals, one of which is connected in common to the output terminal of said first AND gate, and the second of which is respectively connected to each of the signal windings on each of said remaining heads;

(k) and a magnetic erasing device in coaction with said receiver disc and disposed between the last of said magnetic reading heads and said magnetic recording heads for erasing said magnetized discrete areas, whereby the output response of said first logical AND gate will permit the remaining AND gates to produce an output response only when the recorded manifestations of the synchronizing impulses are aligned with the last two of said reading heads.

References Cited by the Examiner

UNITED STATES PATENTS

| | | | |
|---|---|---|---|
| 2,770,796 | 11/56 | Boer | 340—174.1 |
| 2,831,058 | 4/58 | Finch | 178—23 |
| 2,906,822 | 9/59 | Schultheis | 340—183 |
| 2,907,009 | 9/59 | Lesser | 340—147 |
| 2,948,884 | 8/60 | Guerber et al. | 340—174.1 |

NEIL C. READ, *Primary Examiner.*